March 4, 1969 H. F. RAYFIELD 3,430,878

TAPE APPARATUS

Filed Jan. 11, 1967 Sheet 1 of 2

INVENTOR.
HARRY F. RAYFIELD

BY Christie, Parker & Hale
ATTORNEYS.

INVENTOR.
HARRY F. RAYFIELD
BY
Christie, Parker & Hale
ATTORNEYS.

United States Patent Office
3,430,878
Patented Mar. 4, 1969

3,430,878
TAPE APPARATUS
Harry F. Rayfield, Bradbury, Calif., assignor to Burroughs Corporation, Detroit, Mich., a corporation of Michigan
Continuation-in-part of application Ser. No. 459,625, June 30, 1965. This application Jan. 11, 1967, Ser. No. 608,594
U.S. Cl. 242—55.12 12 Claims
Int. Cl. G11b *15/44*

ABSTRACT OF THE DISCLOSURE

A closed-air system for tape handling apparatus employing vacuum columns. The tape handling components, including vacuum columns, are located in an enclosure which excludes the tape storage reels. Tape from the reels enters the enclosure through slots. A vacuum pump withdraws air from the vacuum columns. The withdrawn air is filtered and returned to the enclosure at a point outside of the vacuum columns. Preferably, the enclosure is maintained substantially at atmospheric pressure.

This application is a continuation-in-part of my application, Ser. No. 459,625, filed on June 30, 1965, which matured into Patent 3,345,007 on Oct. 3, 1967.

This invention relates to tape apparatus and, more particularly, to multiple station tape handling apparatus.

Tape transport systems have been extensively employed in the art of digital computing. One example of the prior art tape transport systems particularly adapted for use in a digital system is disclosed in Patent No. 2,921,753. In general, tape transport systems are relatively high cost devices since some of the components thereof require high precision in their manufacture and control. When a plurality of tape transport devices are required, it has been common practice to house a plurality of individual tape transport systems in a single cabinet. This, of course, requires that each of the high-precision components be included with each individual package and is essentially a convenient assembly of individual units in a single rather than a multiplicity of housings. Furthermore, such an arrangement has an overall size or space requirement that is dictated by the sizes of the individual tape stations. In one particular prior art multiple station device, the tape stations are arranged in horizontal and vertical decks. For a four station tape device, two horizontal tape stations are arranged with two vertical decks to reduce the overall size. Arranged in this fashion, the cabinet is 30 inches by 60 inches and stands 72 inches high. Another element that is important in the overall size and cost of these multiple station tape devices is the vacuum columns for controlling the winding and unwinding speeds of the tape reels through detecting and signalling the loop lengths. Such vacuum column loop controls are exemplified by the systems described in said Patent No. 2,921,753.

The present invention is concerned with maintaining the work surface on which tape comes into contact with tape handling components such as capstans, pinch rollers, transducers, and tape guiding elements free of dust particles and other foreign matter. This permits information to be stored on the tape at high densities without unduly increasing error. A cover, which excludes the tape storage reels, encloses the work surface. The cover seals off the work surface except for small slots through which the tape passes between the reels and the work surface. Since the reels are located outside of the cover, reel changing can be accomplished without exposing the work surface to the atmosphere.

Most advantageously, vacuum columns that provide buffer storage for tape passing along the work surface are included on the work surface under the cover. As air is withdrawn from the bottom of the vacuum columns, it is filtered and returned to the work surface area enclosed by the cover. Thus, the vacuum pump required to operate the vacuum columns also serves as the prime mover in a closed, recirculating air filtering system that continually cleans the air within the enclosed area.

Preferably, the air discharged by the vacuum pump into the enclosed area is substantially at the pressure of the atmosphere outside of the enclosed area. Consequently, very little exchange of air between the inside and the outside of the enclosed area takes place through the tape slots.

These and other features of the invention are considered further in the following detailed description taken in conjunction with the drawings, in which.

Figure 1:
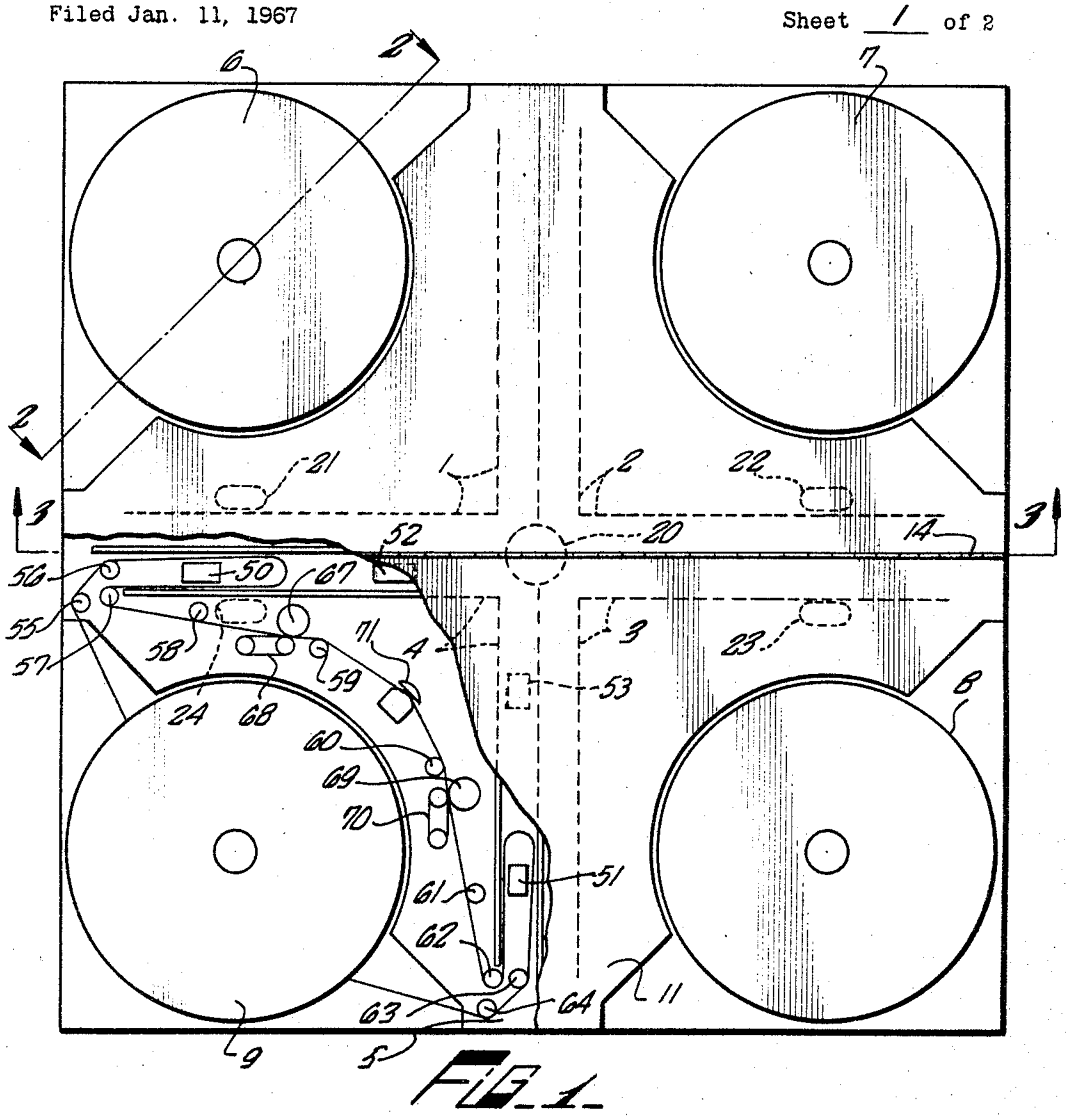
FIG. 1 is a top view of multiple station tape handling apparatus.
Figure 2:
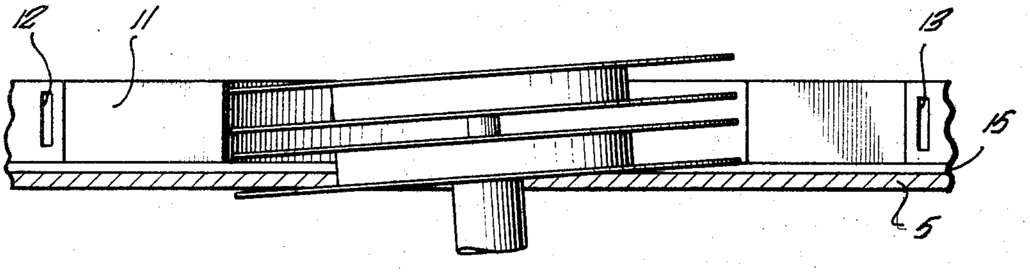
FIG. 2 is a side elevation view in section of a portion of the apparatus of FIG. 1.

In FIGS. 1 and 2, the top of the multiple station tape handling apparatus of the type disclosed in my above-mentioned Patent 3,345,007, is shown. Pairs 1, 2, 3, and 4 of orthogonally arranged vacuum columns are mounted on a deck plate 5 in the form of a cross that defines four quadrants. Pairs 6, 7, 8, and 9 of coaxially arranged reels are located in the quadrants defined by vacuum column pairs 1, 2, 3, and 4, respectively. A cover 11 encloses the area over deck plate 5. The walls of vacuum column pairs 1, 2, 3, and 4 extend from the surface of deck plate 5 to the top surface of cover 11. In each quadrant, cover 11 has two slots (such as slots 12 and 13 associated with reel pair 6 in FIG. 2) through which the tape from the pair of reels associated with the quadrant passes into the enclosure formed by deck plate 5 and cover 11. A strip 15 of resilient material is cemented to the edge of cover 11 coming into contact with deck plate 5 to establish an air-tight seal where they join. Cover 11 is divided into two halves that are connected by a hinge 14. Either half of cover 11 can be raised to permit access to one half of the surface of deck plate 5 without exposing the other half of the enclosure to the atmosphere.

In addition to the vacuum columns represented in FIG. 1, other tape handling elements would be mounted on deck plate 5. In FIG. 1 a conventional arrangement of transducers and tape guiding elements is illustrated in connection with reel pair 9. It will be appreciated that each of the other transducing stations are similarly arranged on deck plate 5. A magnetic transducer 71 is mounted on deck plate 5 adjacent reel pair 9 with a plurality of tape guiding rollers 55 through 64 arranged on opposite sides thereof. A forward drive capstan 67 is arranged with a pivotable pinch roller assembly 68 on one side of transducer 71 and, in the same fashion, a reverse drive capstan 69 is arranged with a pivotable pinch roller assembly 70 on the other side of transducer 71.

Figure 3:
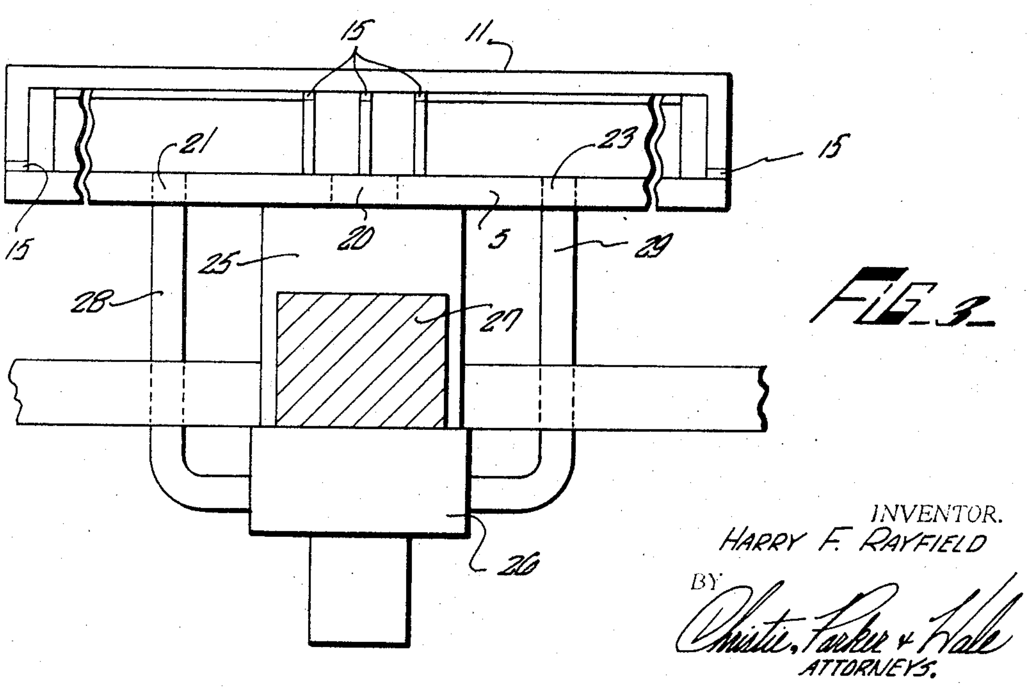
FIG. 3 is a schematic diagram of the enclosed, recirculating air filtering system of the invention.

Deck plate 5 has openings 20, 21, 22, 23, and 24 through it within cover 11. Opening 20 is located at the confluence of vacuum column pairs 1, 2, 3, and 4. Openings 21, 22, 23, and 24 are each located in a different quadrant outside of the vacuum columns. As illustrated in FIG. 3, opening 20 leads to a reservoir 25 located underneath deck plate 5. A vacuum pump 26, having an absolute filter 27 situated over its intake, withdraws air from the vacuum columns through opening 20. Vacuum pump 26 recirculates the air withdrawn through opening 20 by means of conduits 28 and 29. Conduit 28 is coupled by a Y-joint (not shown) to openings 21 and 24, while conduit 29 is coupled by a Y-joint (not shown) to openings 22 and 23. Preferably, the air recirculated by vacuum pump 26 enters the enclosure formed by deck plate 5 and cover 11 at a pressure substantially equal to the atmospheric pressure existing outside of the enclosure.

Figure 4:
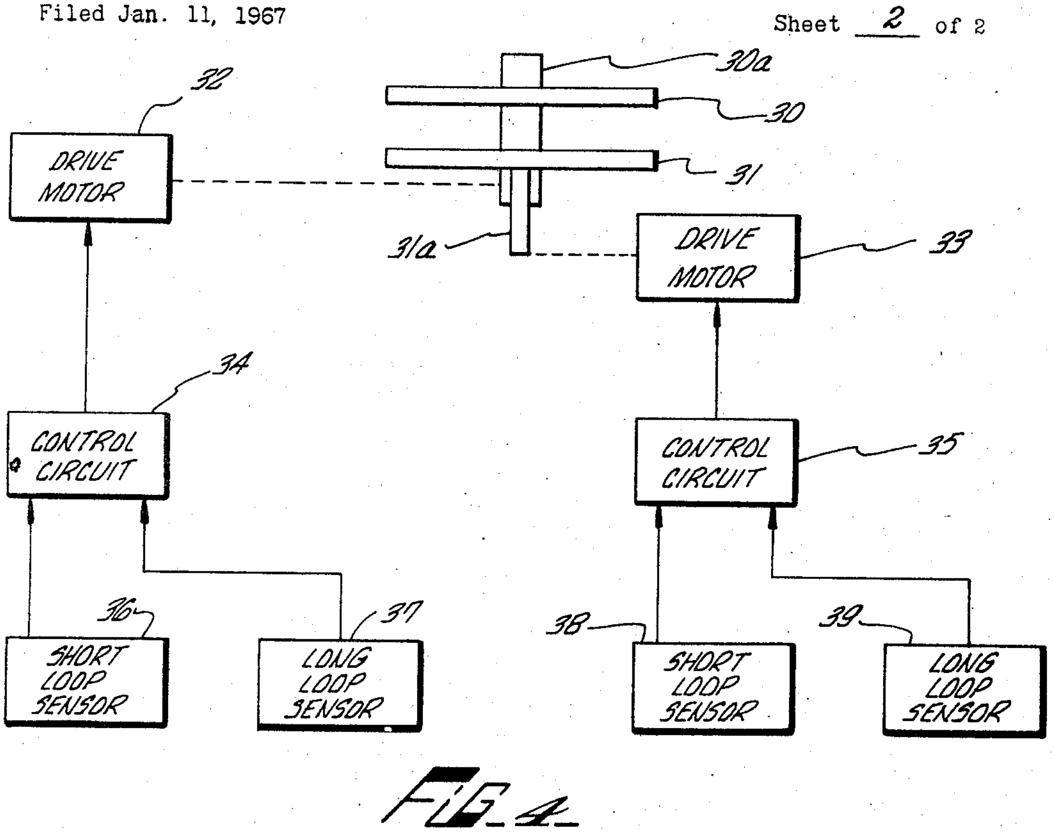
FIG. 4 is a schematic diagram partially in block form of apparatus for driving a pair of reels.

Reference is now made to FIG. 4 for a description of the operation of the vacuum column pair associated with one pair of reels. Reels 30 and 31 are mounted on individual drive shafts 30*a* and 31*a* that are coaxially mounted and each coupled to a drive motor. A drive motor 32 is coupled to shaft 30*a* for driving reel 30, which may be considered the supply reel for the tape, while a drive motor 33 is coupled to drive the shaft 31*a* and thereby the reel 31, which functions as the takeup reel. Drive motors 32 and 33 are provided with individual control circuits 34 and 35 connected thereto and which control circuits coact with individual means for providing a signal to control the rate at which reels 30 and 31 wind and unwind tape, respectively, as is conventional. Control circuit 34 arranged with the drive motor 32 for the supply reel 30 is connected to a short loop sensor 36 and a long loop sensor 37. In the same fashion, control circuit 35 is controlled by a short loop sensor 38 and a long loop sensor 39. Loop sensors 36–39 provide a signal indicating that the length of loops of the tape is either too long or too short for proper operation. For this purpose, the tape is looped through a vacuum column and the lenght-of-loop signals are generated by vacuum-operated switches. The aforementioned control circuits and the other conventional controls for the tape stations would be housed below the reels.

The general construction of vacuum column pairs 1, 2, 3, and 4 is well known in the art. Suffice it to say that for the purposes of the present invention, each vacuum column is provided with a pair of vacuum-operated switches mounted behind the vacuum column proper to function as the short and long loop sensors for any one reel. Specifically, referring to vacuum column pair 4 in FIG. 1, it will be seen that the vacuum columns are provided with vacuum switches 50 and 51 that indicate a short length of tape loop in the column and vacuum switches 52 and 53 that indicate a long length of tape loop in the column. The tape loops, of course, are defined within a particular vacuum column to be sealed against the side walls and vacuum pump 26 maintains a differential of pressure on the opposite sides of the tape loop. When the tape loop travels beyond one of the vacuum switches, a signal is provided to the corresponding tape reel drive to speed up or slow down so as to hold the length of the loop within the limits set by the vacuum switches. If a more comprehensive discussion of these controls are necessary, reference to Patent No. 2,921,753, which is incorporated herein by reference, may be had.

The closed air system would most advantageously include an air cooler as disclosed and claimed in a copending application of Harold E. Hass, Robert G. Nordman, and Harry F. Rayfield, entitled "Vacuum System for Multiple Station Tape Handling Apparatus," filed Mar. 21, 1966, and assigned to the same assignee as the present application. This application matured into Patent 3,379,352 on Apr. 23, 1968. Since this air cooler is not part of the invention of the present application, it has not been shown herein.

What is claimed is:

1. In tape apparatus the combination comprising: a base; a plurality of tape storage reels mounted in proximity to said base in spaced-apart relationship; a plurality of vacuum columns mounted on the base adjacent said reels, said vacuum columns having tape loop-length sensors responsive to the length of the tape loop in each vacuum column; a vacuum source coupled to each of said vacuum columns to form a closed system including means for filtering the air circulating therein; individual transducing means mounted on the base adjacent said reels; individual tape guiding means mounted adjacent said reels and said transducing means for guiding tape from one reel through one of the vacuum columns, past the individual transducing means, through the other vacuum column and back to the other reel; and reel drive means coupled to each of said reels and connected to be responsive to the operation of said sensors.

2. Tape handling apparatus comprising: a pair of tape storage reels; a work surface adapted to accommodate tape handling components; a cover lying over the work surface to form an enclosure therewith which excludes the pair of reels, the enclosure having slots through which tape passes between the reels and the work surface; means for withdrawing air from the enclosure; means for cleaning the withdrawn air; and means for carrying the cleaned air back into the enclosure.

3. The tape handling apparatus of claim 2, in which the pressure inside the enclosure is maintained substantially equal to the pressure outside of the enclosure.

4. The tape handling apparatus of claim 2, in which a pair of vacuum columns are located inside of the enclosure and the withdrawing means is a vacuum pump that withdraws air from the vacuum columns.

5. The tape handling apparatus of claim 4, in which the air cleaning means is an absolute filter.

6. The tape handling apparatus of claim 4, in which the withdrawn air is recirculated into the enclosure at a point external to the vacuum columns.

7. Tape handling apparatus comprising: a pair of tape storage reels; a work surface adapted to accommodate tape handling components; a pair of vacuum columns mounted on the work surface; means for withdrawing air from the vacuum columns; a cover enclosing an area which includes at least the work surface; and means for recirculating the air withdrawn from the pair of vacuum columns into the enclosed area.

8. The tape handling apparatus of claim 7, in which the pair of reels lies outside of the enclosed area and slots are provided in the cover for passage of tape from the reels to the work surface.

9. The tape handling apparatus of claim 8, in which the pressure of the recirculated air is substantially equal to the atmospheric pressure outside the enclosed area.

10. Multiple station tape handling apparatus comprising: a deck plate; four pairs of orthogonal vacuum columns arranged on the deck plate to form a cross that defines four quadrants; four pairs of coaxially arranged tape storage reels, each pair being located in one of the quadrants defined by the pairs of vacuum columns; a cover defining an enclosure with the deck plate that excludes the reel pairs, the cover having a slot corresponding to each reel to permit access to the deck plate for tape stored on the reels; a vacuum pump for withdrawing air from the pairs of vacuum columns; means located substantially at the intersection of the pairs of vacuum columns for coupling the vacuum columns to the vacuum pump; means for recirculating air from the vacuum pump into the enclosure; and means for filtering the recirculated air.

11. The tape handling apparatus of claim 10, in which the means for recirculating air into the enclosure comprises at least one conduit leading into each quadrant of the enclosure.

12. The tape handling apparatus of claim 10, in which the cover is divided into two halves connected by a hinge so arranged that one half of the cover can be raised to expose the corresponding half of the deck plate without exposing the other half of the deck plate.

References Cited

UNITED STATES PATENTS

| | | | |
|---|---|---|---|
| 2,983,794 | 5/1961 | Shields | 242—55.12 X |
| 3,345,007 | 10/1967 | Rayfield | 242—55.12 |

LEONARD D. CHRISTIAN, *Primary Examiner.*